(12) United States Patent
Hyun

(10) Patent No.: US 11,172,663 B2
(45) Date of Patent: Nov. 16, 2021

(54) FISHING REEL PROVIDED WITH FIXED CONSTANT BRAKE AND MOVABLE INERTIAL FORCE BRAKE

(71) Applicant: DOYO ENGINEERING CO., LTD., Bucheon (KR)

(72) Inventor: Kang Ho Hyun, Bucheon (KR)

(73) Assignee: DOYO ENGINEERING CO., LTD., Bucheon (KR)

(*) Notice: Subject to any disclaimer, the term of this patent is extended or adjusted under 35 U.S.C. 154(b) by 0 days.

(21) Appl. No.: 17/038,951

(22) Filed: Sep. 30, 2020

(65) Prior Publication Data
US 2021/0100233 A1    Apr. 8, 2021

(30) Foreign Application Priority Data
Oct. 7, 2019   (KR) .......................... 10-2019-0123891

(51) Int. Cl.
*A01K 89/01*      (2006.01)
*A01K 89/0155*    (2006.01)
*A01K 89/00*      (2006.01)

(52) U.S. Cl.
CPC ...... *A01K 89/01555* (2013.01); *A01K 89/004* (2015.05)

(58) Field of Classification Search
CPC .......... A01K 89/0155; A01K 89/01555; A01K 89/01557
See application file for complete search history.

(56) References Cited

U.S. PATENT DOCUMENTS

| | | | | |
|---|---|---|---|---|
| 6,086,005 A * | 7/2000 | Kobayashi | ....... | A01K 89/01555 242/288 |
| 6,126,105 A * | 10/2000 | Yamaguchi | ...... | A01K 89/01555 242/288 |
| 6,206,311 B1 * | 3/2001 | Kim | ..................... | A01K 89/059 242/288 |
| 6,422,498 B1 * | 7/2002 | Littau | ................ | A01K 89/0155 242/288 |
| 2005/0178869 A1 * | 8/2005 | Hyun | ................ | A01K 89/01555 242/288 |
| 2009/0127367 A1 * | 5/2009 | Tsutsumi | .......... | A01K 89/01555 242/286 |
| 2012/0056029 A1 * | 3/2012 | Sim | ..................... | A01K 89/0155 242/273 |
| 2015/0014460 A1 * | 1/2015 | Hyun | ................. | A01K 89/0155 242/289 |

(Continued)

FOREIGN PATENT DOCUMENTS

| KR | 200144801 | 6/1999 |
|---|---|---|
| KR | 20120112132 | 10/2012 |

(Continued)

*Primary Examiner* — Emmanuel M Marcelo
(74) *Attorney, Agent, or Firm* — Cantor Colburn LLP

(57) ABSTRACT

A fishing reel provided with a fixed constant brake and a movable inertial force brake is provided. In the fishing reel, a user may adjust a braking force to use according to his or her fishing method by utilizing only advantages of conventional centrifugal brakes, magnet brakes, and inertial force brakes, the advantages including prevention of pad wear, prevention of casting distance reduction and backlash when a spool rotates at a low speed, compatible use tailored to left-handed or right-handed handles, etc.

4 Claims, 16 Drawing Sheets

(56) References Cited

U.S. PATENT DOCUMENTS

| | | | | |
|---|---|---|---|---|
| 2016/0037759 | A1* | 2/2016 | Ikebukuro | A01K 89/01555 242/288 |
| 2017/0142949 | A1* | 5/2017 | Sim | A01K 89/01557 |
| 2018/0338480 | A1* | 11/2018 | Hyun | A01K 89/0192 |
| 2020/0236918 | A1* | 7/2020 | Hyun | A01K 89/01555 |

FOREIGN PATENT DOCUMENTS

| KR | 20120133584 | 12/2012 |
|---|---|---|
| KR | 20150006698 | 1/2015 |

\* cited by examiner

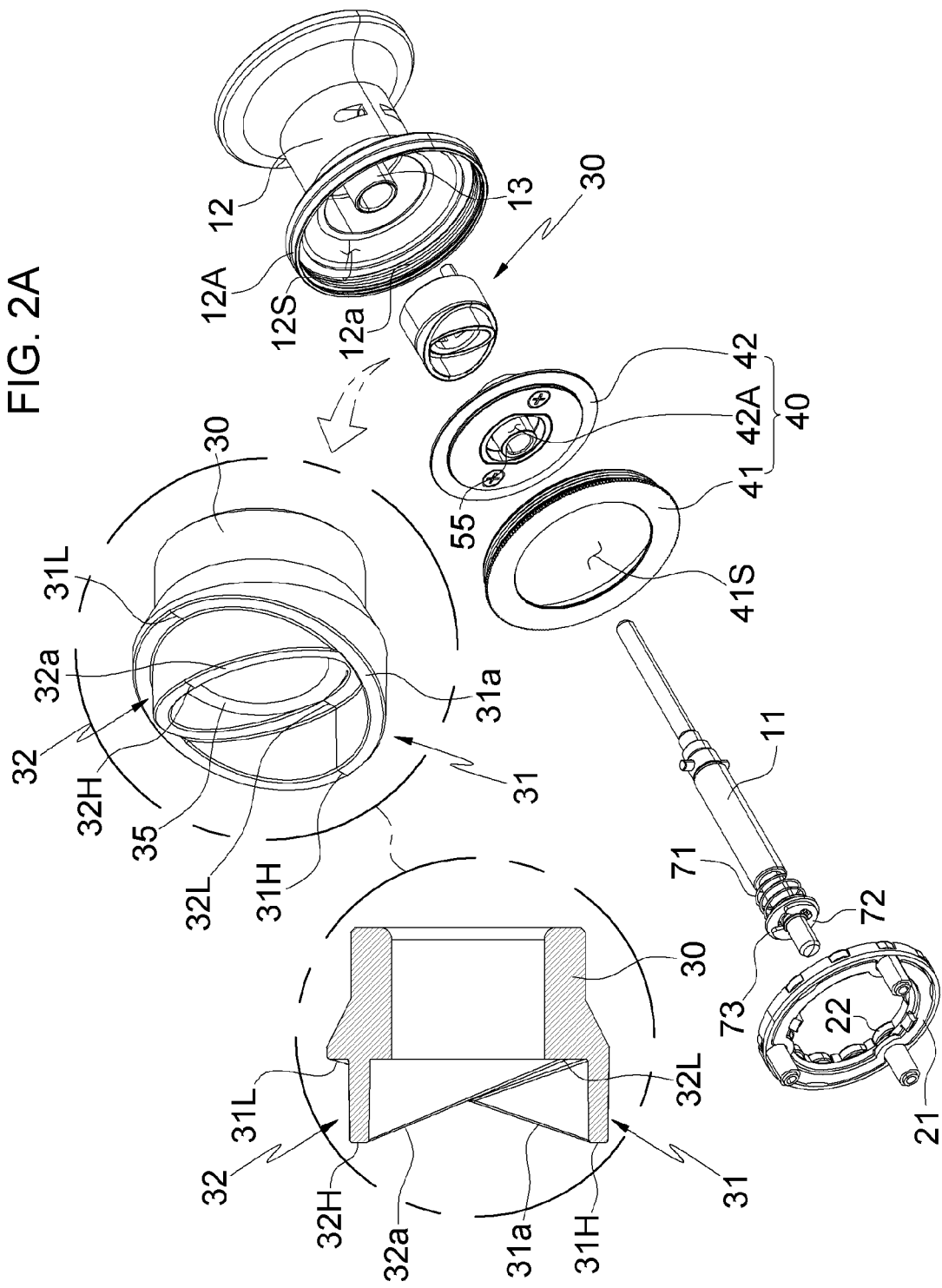

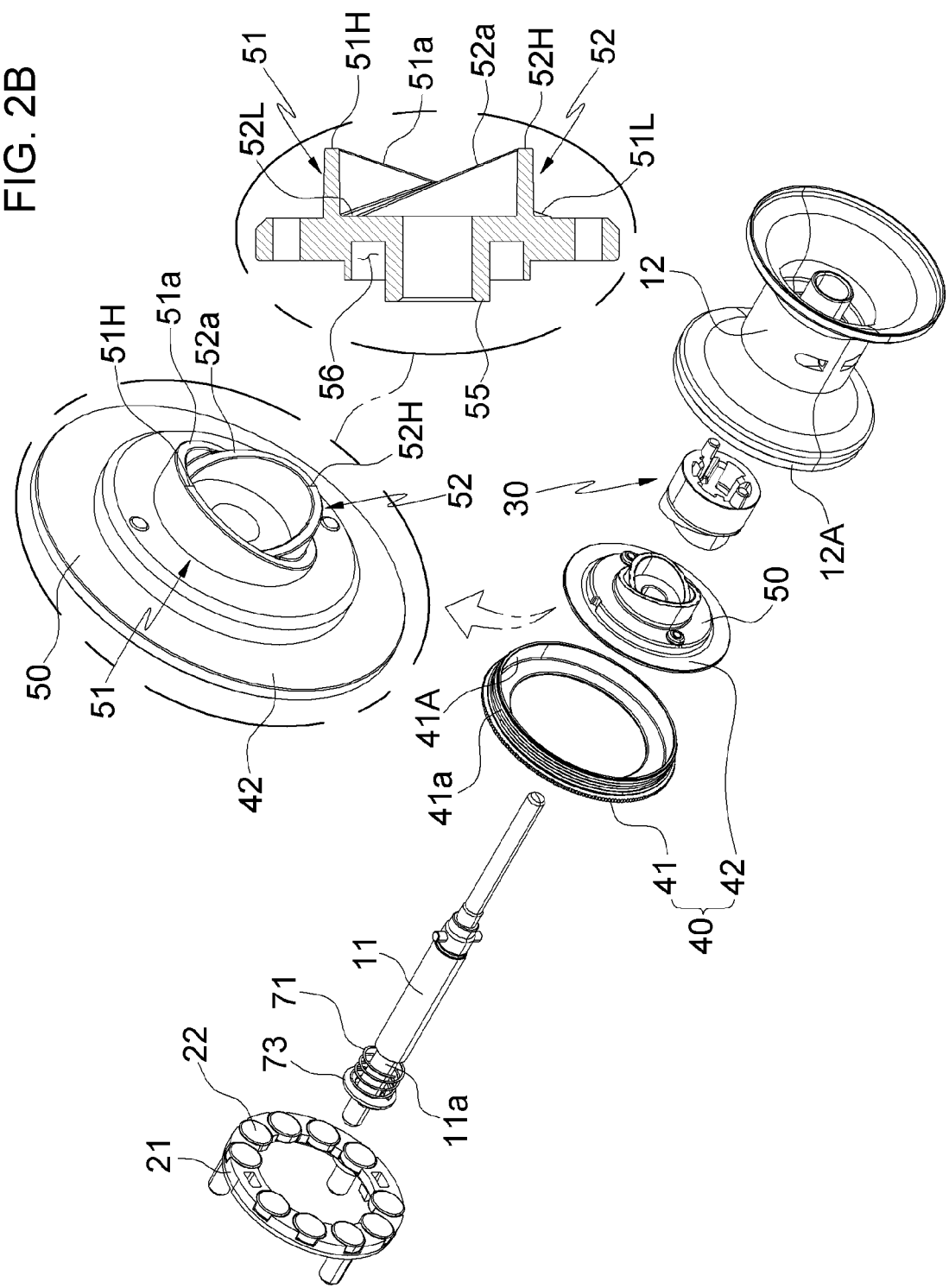

FISHING REEL PROVIDED WITH FIXED CONSTANT BRAKE AND MOVABLE INERTIAL FORCE BRAKE

BACKGROUND OF THE INVENTION

Field of the Invention

The present disclosure relates to a fishing reel provided with a fixed constant brake and a movable inertial force brake and, more particularly, to a fishing reel in which a user may use the fishing reel by adjusting a braking force according to his or her fishing method by utilizing only advantages of conventional centrifugal brakes, magnet brakes, and inertial force brakes, the advantages including prevention of pad wear, prevention of casting distance reduction and backlash when a spool rotates at a low speed, compatible use tailored to left-handed or right-handed handles, etc.

Description of the Related Art

In general, when casting a fishing reel, the rotational speed of a spool from which a fishing line is released is faster than the flying speed of a lure, and thus a casting distance of the lure is shortened or the fishing line is entangled, which is called a backlash phenomenon.

In order to prevent such a backlash phenomenon, the fishing reel largely uses a friction brake that uses physical friction and a magnet brake that uses action of magnetic force of a magnet.

Conventional friction brakes have centrifugal brakes, which have a maximum rotational force at the beginning of casting, and since friction occurs when a brake shoe directly contacts with a brake pad due to centrifugal force and the like, the rotational force is gradually reduced and the rotational speed of the spool is reduced, so that the rotational braking force of the friction brake is reduced, (that is, the rotational force and braking force of the spool are proportional to each other), whereby, although the friction brakes are more advantageous for long-distance casting than magnet brakes, there is a problem in that not only is it difficult to fine-tune the braking force, but also wear occurs and noise is increased due to the friction between the brake shoe and the brake pad.

A magnet brake for solving the problems as above is a non-contact brake different from the friction brake, and by using the magnetism of a plurality of braking magnets provided in a reel body, a magnetic force acts on a rotating spool to reduce the rotational speed of the spool.

In the conventional magnet brake, since the braking magnet and the brake pad do not contact with each other, there is an advantage in that unlike the friction brake, noise and wear of parts do not occur, and it is easy to fine-tune the braking force. However, since the braking force is constant regardless of the rotational speed of the spool, there is a problem in that the casting distance decreases as the braking force continues to occur even when the spool rotates at a low speed.

In addition, there is an inertial force brake that reduces the rotational speed of a spool by grafting a movable spool plate to the magnet brake so that the spool plate approaches the braking magnet by inertial force when the spool rotates. However, in the conventional inertial force brake, a position of the spool plate is changed by contacting the tapered surface of the spool plate with a pin assembled in a direction perpendicular to an axis of a shaft, whereby, since the rotational direction of the spool is different in the case of the right-handed handle and the left-handed handle, during casting, there is a problem in that the inertial force brakes may not be manufactured and used interchangeably for right hand use and left hand use.

In addition, in the case of the inertial force brake, when casting with a very low rotational force (i.e., speed) of the spool, such as pitching, since the inertial force is not generated, the inertial force brake does not operate and the braking force is not generated, thereby causing a backlash phenomenon.

DOCUMENTS OF RELATED ART (Patent Document 1) Korean Patent Application Publication No. 10-2015-0006698
(Patent Document 2) Utility Model Registration No. 20-0144801
(Patent Document 3) Korean Patent Application Publication No. 10-2012-0112132
(Patent Document 4) Korean Patent Application Publication No. 10-2012-0133584

SUMMARY OF THE INVENTION

Accordingly, the present disclosure is devised to solve the problems as described above, and an objective of the present disclosure is to provide a fishing reel provided with a fixed constant brake and a movable inertial force brake that may be used by adjusting braking force according to a user's own fishing method by utilizing only the advantages of the conventional centrifugal brakes, magnet brakes, and inertial force brakes, the advantages including prevention of pad wear, prevention of casting distance reduction and prevention of backlash when a spool rotates at a low speed, compatible use tailored to left-handed or right-handed handles, etc.

In order to achieve the above objective, a fishing reel according to the present disclosure includes: a spool provided with a body part and a shaft part, the body part being coaxially installed on a reel body by a shaft to rotate and having a fishing line wound on an outer surface thereof and being open at opposite sides thereof, and the shaft part being connected to an inner side of the body part and through which the shaft is passed and coupled thereto; a braking magnet provided by being spaced apart at a predetermined interval at an outer side of an opening on a first side of the body part; a spool cam fitted to the shaft part to rotate with the spool and provided with a pressing part protruding to the first side of the body part so as to allow a lowest point and a highest point to be obliquely connected to each other in a circumferential direction; a spool plate provided with a fixed pad and a movable pad, the fixed pad being coupled to the opening at the first side of the body part, provided with an exposed hole having a predetermined size in a center thereof, and having a magnetic force of the braking magnet always acting thereon, and the movable pad being fitted to a first side end of the shaft and coupled thereto to be movable forward and backward in a longitudinal direction of the shaft toward the exposed hole and having the magnetic force of the braking magnet with an acting magnitude changed depending on a forward and backward distance of the movable pad; and a movable cam coupled to a second side of the movable pad and provided with a pressed part protruding to the second side to contact with the pressing part, wherein when the spool rotates below a predetermined speed, an inertial force does not act, so that a basic braking force for rotation of the spool is generated by the magnetic force acting on the fixed pad in a state where the movable pad does not move forward to the braking magnet, whereas, when the spool rotates above the predetermined speed, the pressed part positioned at the lowest point of the pressing part ascends along the pressing part toward the highest point of the pressing part due to an action of the inertial force, so the movable pad moves forward to the braking magnet, and a distance therebetween is decreased, so that an additional braking force against the rotation of the spool is generated and strengthened.

In addition, the fishing reel according to the present disclosure may further include: an elastic body elastically supporting the movable pad so as to move the movable pad backward in a second side direction away from the braking magnet, wherein, when the spool rotates at a decelerated speed below the predetermined speed, an elastic force of the elastic body may exceed the inertial force, and the pressed part may descend along the pressing part toward the lowest point of the pressing part, so the movable pad may move backward in the second side direction, and the distance may be increased, so that the additional braking force against the rotation of the spool may be decreased and disappears.

Furthermore, in the fishing reel according to the present disclosure, the body part may include a female screw part or a male screw part provided in the opening at the first side of the body part, and the fixed pad may be screwed to the female screw part or the male screw part so that the fixed pad may be detachable and may further include an O-ring fitted to a part which is screwed to the body part, whereby the O-ring may prevent loosening of the fixed pad, and as a degree of compression of the O-ring varies depending on a degree of screw tightening of the fixed pad, a position of the fixed pad may be changed, so that the basic braking force may be finely adjustable.

In addition, in the fishing reel according to the present disclosure, the body part may include a fitting groove provided in the opening at the first side of the body part, and the fixed pad may further include a locking part fitted to the fitting groove and a retainer fixing the locking part to the fitting groove whereby the fixed pad may be detachable.

The fishing reel according to the present disclosure utilizes only the advantages of conventional friction brakes, magnet brakes, and inertial force brakes, so that no noise or wear of parts occurs during use as well as the braking force is automatically adjusted depending on the rotational speed of the spool to prevent the occurrence of backlash, increase the casting distance, and enable a user to precisely control and use the braking force that is suitable for the user. Furthermore, since the magnetic force of the braking magnet acts on the fixed pad even when the rotational speed of the spool, that is, the inertial force is below a predetermined level, there is an advantage in that both of the left-handed handle and the right-handed handle of the fishing reel may be used interchangeably without causing backlash phenomenon due to constant braking force, and there is an effect in that in some cases, it is possible to use the left-handed handle or the right-handed handle only by restricting the operation of the spool cam.

BRIEF DESCRIPTION OF THE DRAWINGS

FIGS. 2A and 2B are exploded perspective views of FIG. 1.

DETAILED DESCRIPTION OF THE INVENTION

Figure 1:
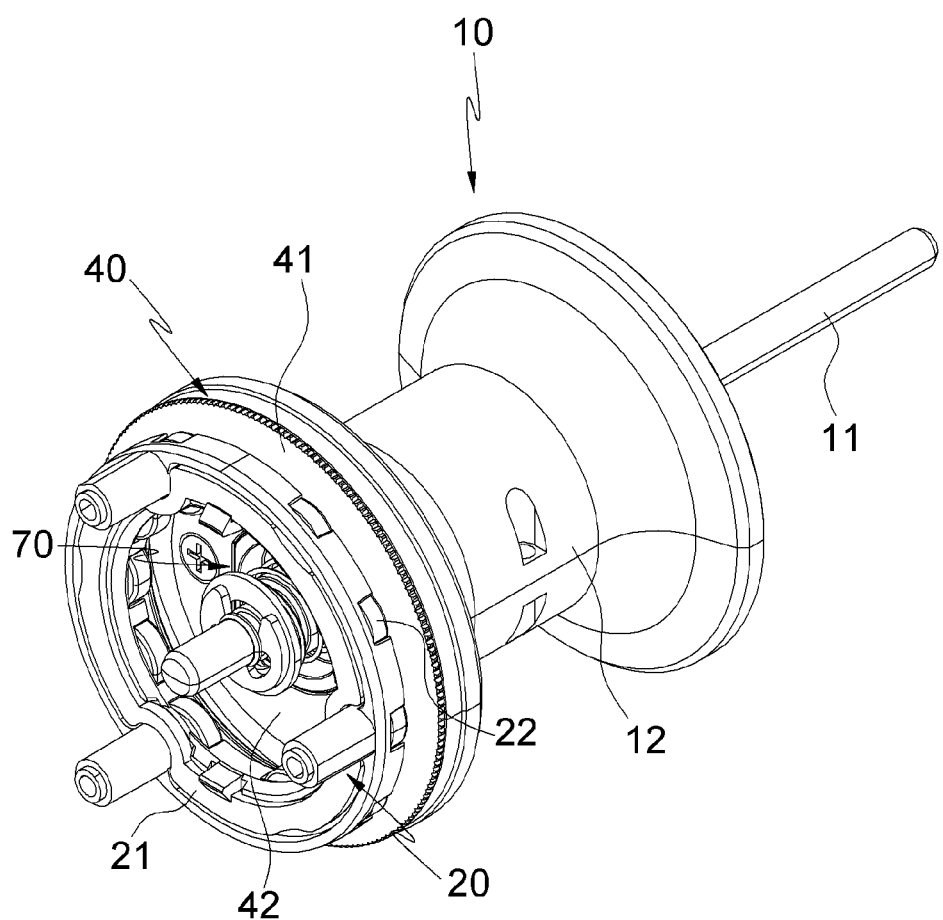
FIG. 1 is a perspective view of a main part showing a first exemplary embodiment of the present disclosure.

The present disclosure may, however, be embodied in many different forms and have various forms, and implementation examples (i.e., aspects or exemplary embodiments) will be described in detail in the specification. However, this is not intended to limit the present disclosure to a particular disclosed form. On the contrary, the present disclosure is to be understood to include all various alternatives, equivalents, and substitutes that may be included within the spirit and technical scope of the present disclosure.

In each diagram, like reference numerals, particularly, tens and ones digits, or reference numerals having like tens digits, ones digits, and alphabet letters refer to like elements having like functions throughout, and unless the context clearly indicates otherwise, elements referred to by reference numerals of the diagrams should be understood based on this standard.

In addition, for convenience of understanding of the elements, in the drawings, sizes or thicknesses may be exaggerated to be large (or thick), may be expressed to be small (or thin) or may be simplified for clarity of illustration, but due to this, the protective scope of the present disclosure should not be interpreted narrowly.

The terminology used herein is for the purpose of describing particular implementation examples (i.e., aspects or exemplary embodiments) only and is not intended to be limiting of the present disclosure. As used herein, the singular forms are intended to include the plural forms as well, unless the context clearly indicates otherwise.

It will be further understood that the terms "comprises", "comprising", "includes", and/or "including" when used herein, specify the presence of stated features, integers, steps, operations, elements, components, and/or combinations thereof, but do not preclude the possibility of presence or addition of one or more other features, integers, steps, operations, elements, components, and/or combinations thereof.

Unless otherwise defined, all terms including technical and scientific terms used herein have the same meaning as commonly understood by one of those skilled in the art to which the present disclosure belongs. It will be further understood that terms as defined in dictionaries commonly used herein should be interpreted as having a meaning that is consistent with their meaning in the context of this specification and the relevant art and will not be interpreted in an idealized or overly formal sense unless expressly so defined herein.

The first ~, the second ~, and the like described in the present specification will only be referred to distinguish components different from each other, and are not limited to the order of manufacture. In addition, in the detailed description of the disclosure and in the claims, the names of the components may not be matched with each other.

Figure 3:
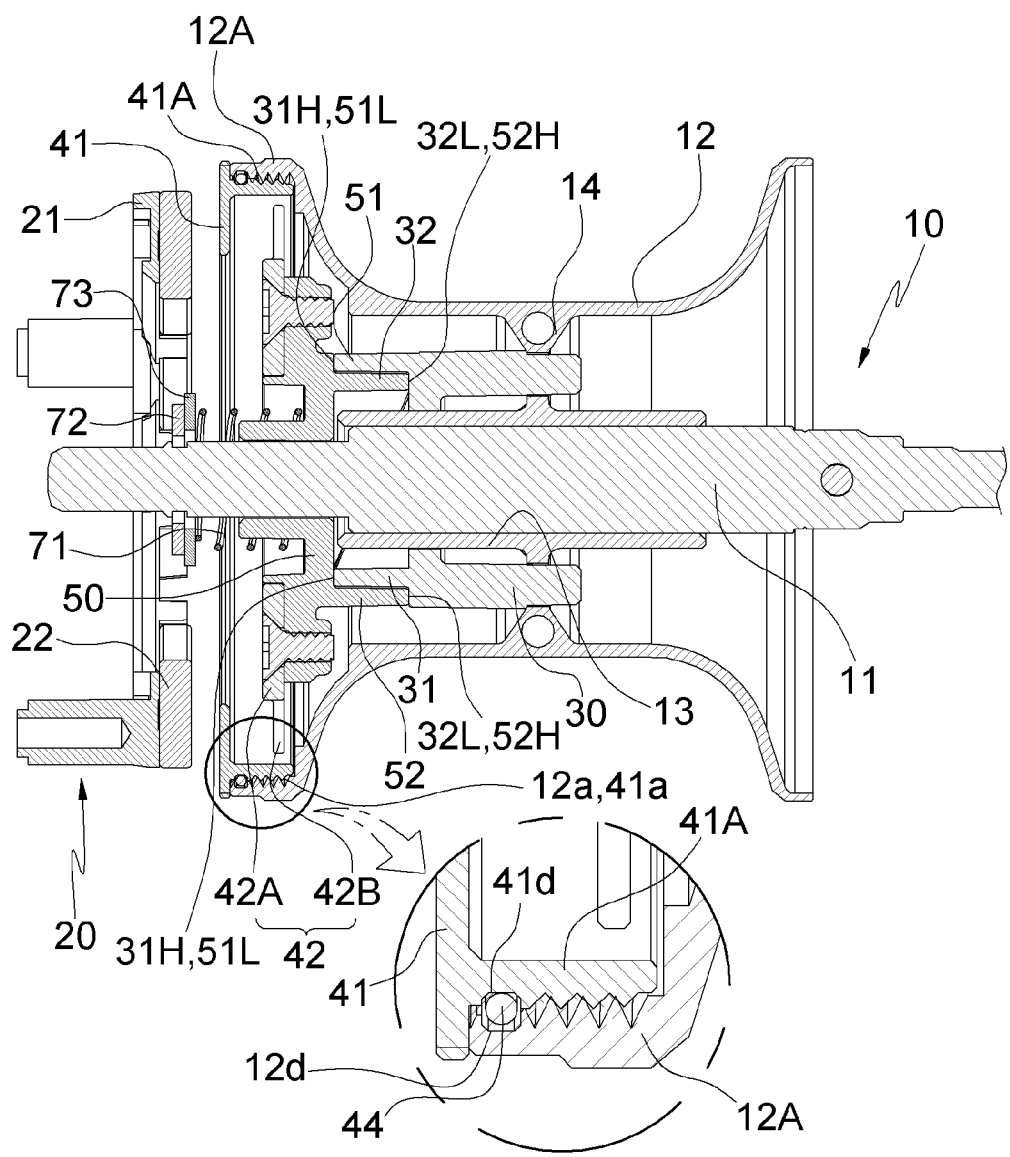
FIG. 3 is a longitudinal sectional view of FIG. 1.
Figure 4A:
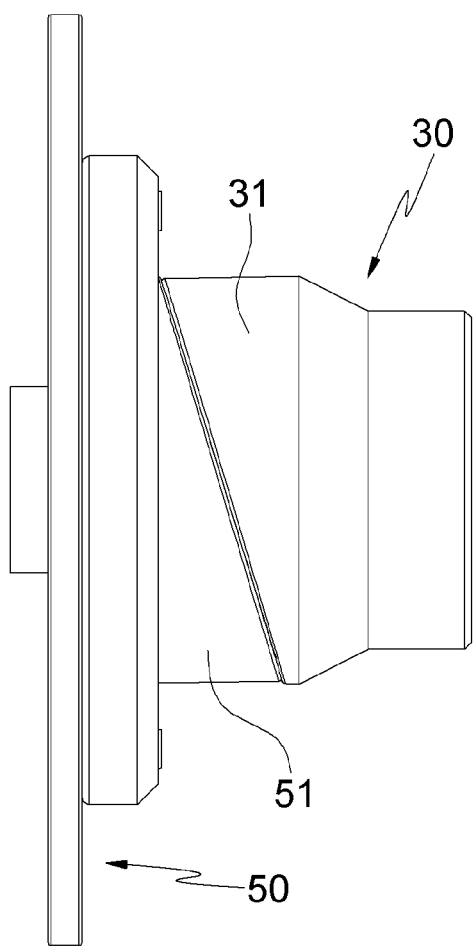
FIGS. 4A and 4B are front views of the main part for showing forward and backward operation of a movable pad in the first exemplary embodiment.
Figure 4B:
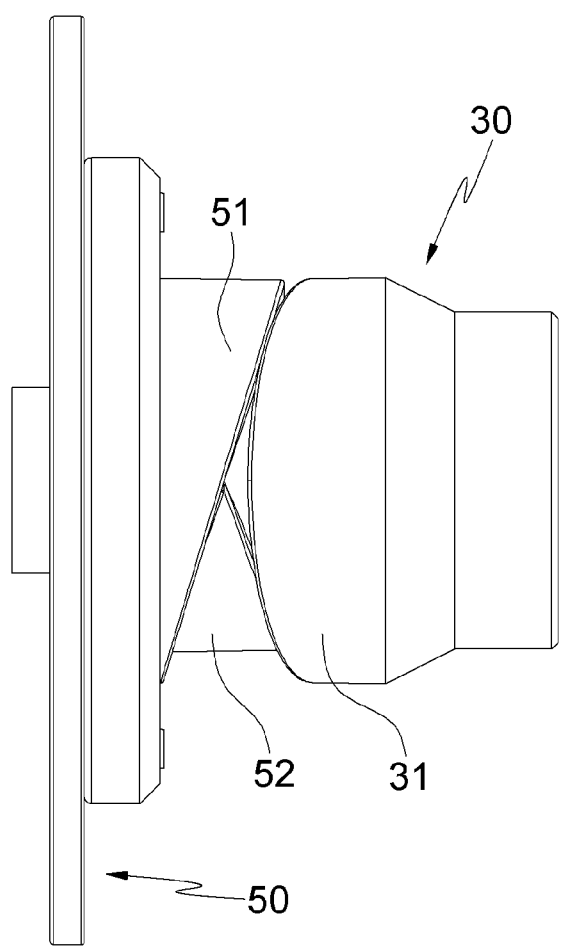
Figure 7:
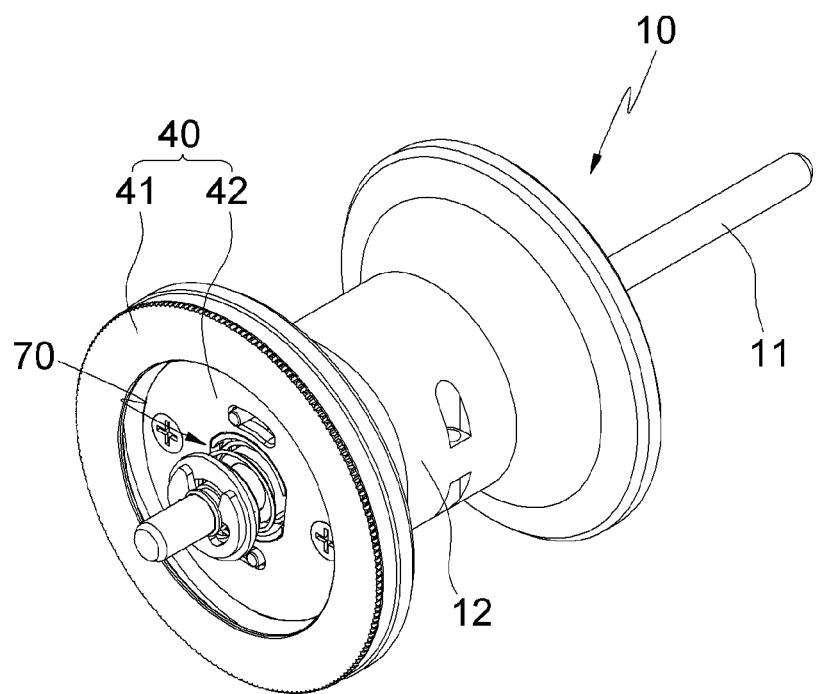
FIG. 7 is a combined perspective view showing a second exemplary embodiment of the present disclosure.
Figure 8A:
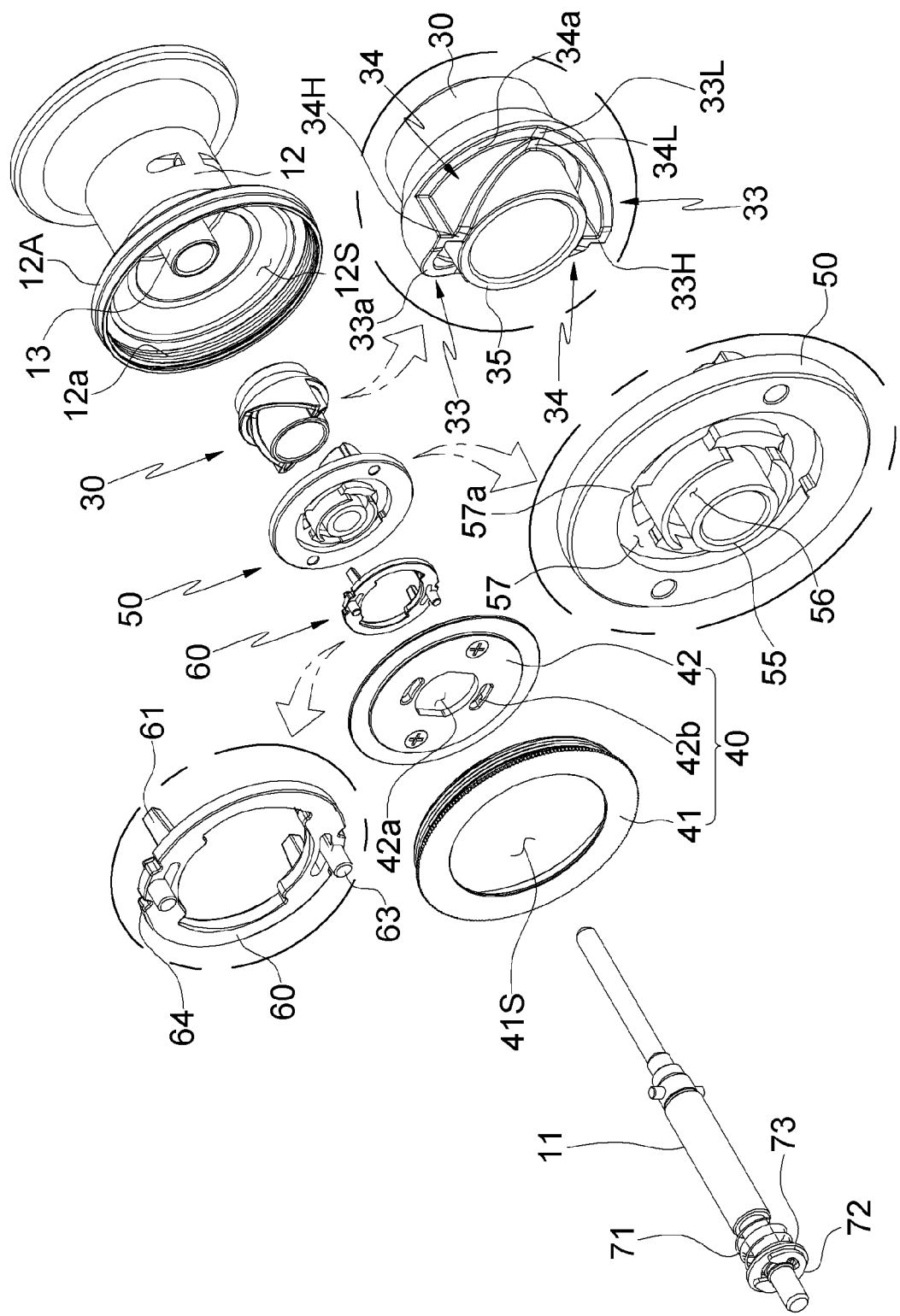
FIGS. 8A and 8B are exploded perspective views of FIG. 5.
Figure 8B:
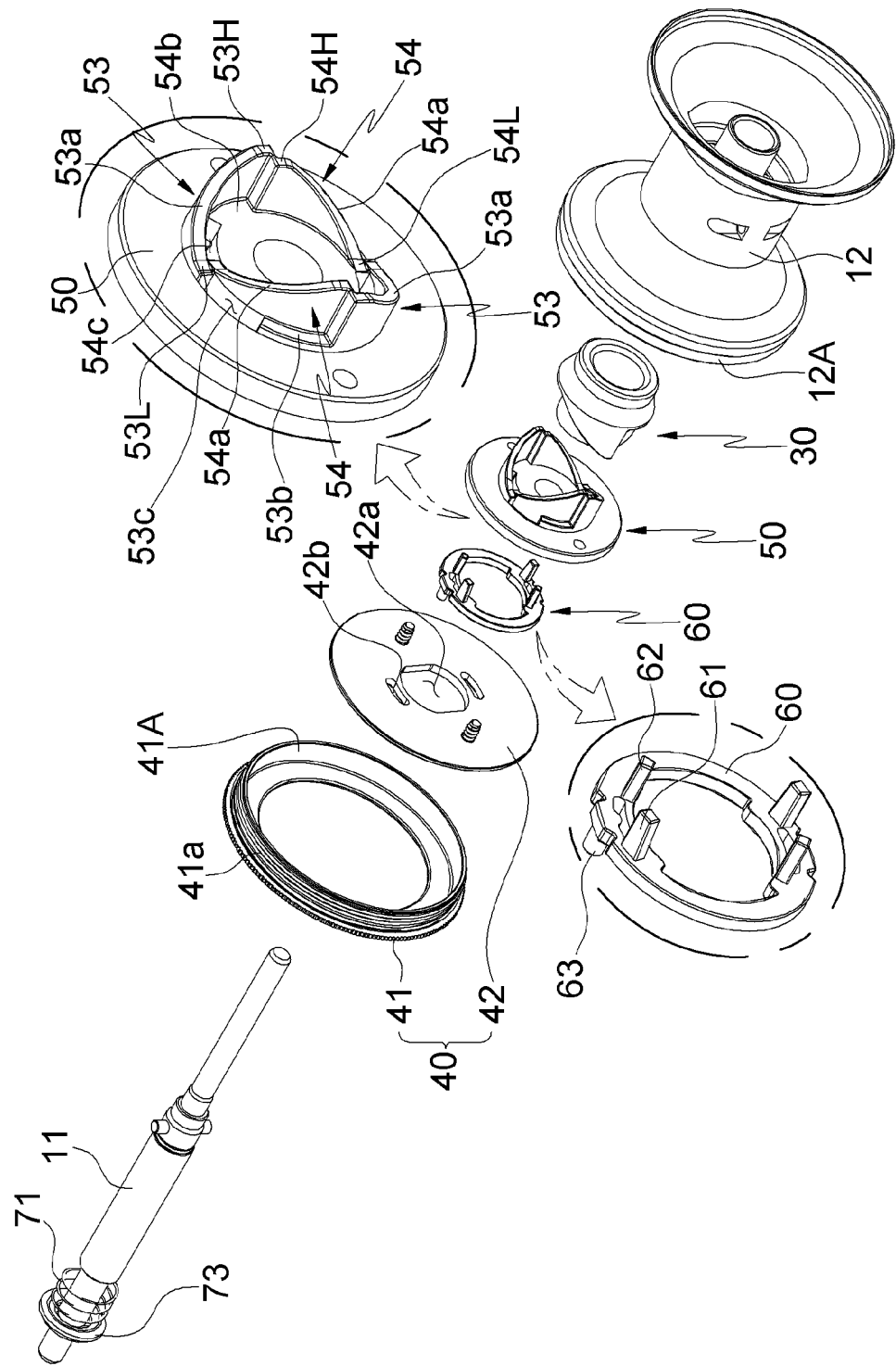
Figure 9:
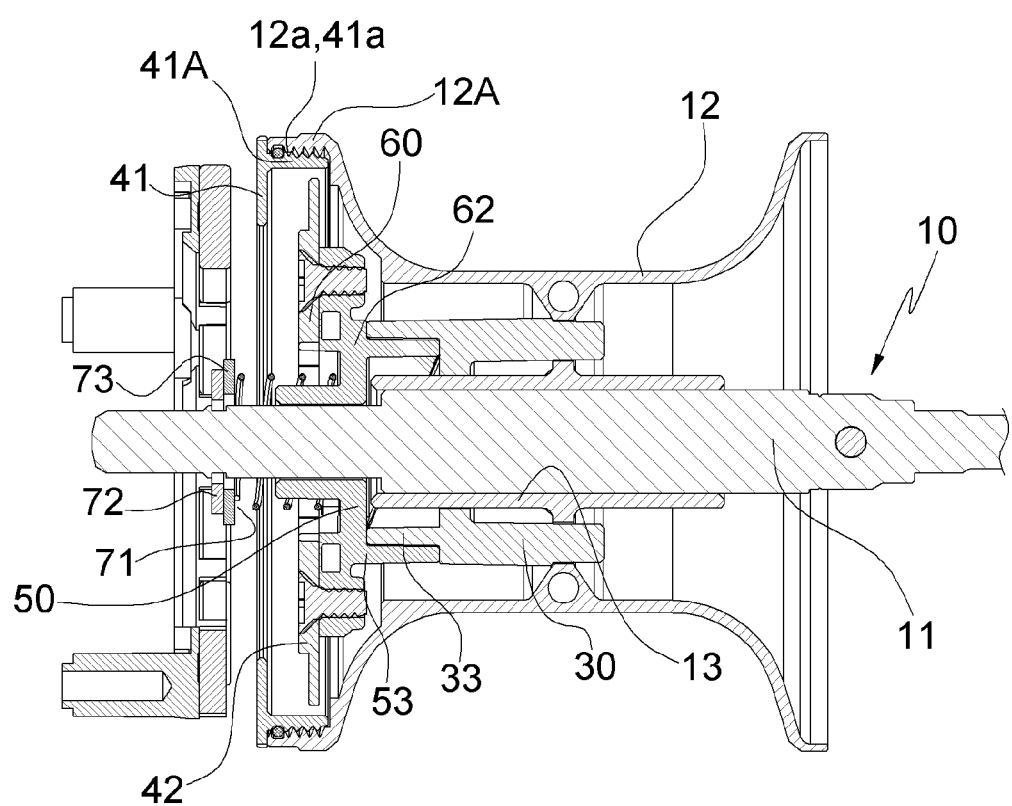
FIG. 9 is a longitudinal sectional view of FIG. 7.

In describing the fishing reel according to the present disclosure, for convenience, when specifying an approximate rough direction standard with reference to FIGS. 3 and 7, a direction in which gravity acts is set as a lower side, and a visible direction, as it is, is set as each of the up, down, left, and right directions. In addition, in the detailed description and claims related to the other drawings as well, unless otherwise specified, directions are specified and described in accordance with this standard.

Hereinafter, a fishing reel according to the present disclosure will be described with reference to the accompanying drawings.

As shown in FIGS. 1 to 6 showing a basic exemplary embodiment of the present disclosure and FIGS. 7 to 10D showing a modified exemplary embodiment of the present disclosure (for reference, a magnetic force generator is omitted in FIGS. 8A and 8B), the present disclosure relates to a fishing reel provided with a fixed constant brake and a movable inertial force brake, and largely includes: a spool 10 on which a fishing line is wound; a braking magnet 22 for generating a braking force; a spool cam 30; a spool plate 40 composed of a fixed pad 41 and a movable pad 42; a movable cam 50; a locking lever 60; and an elastic body 70.

The spool 10 is coaxially installed on a known reel body (not shown) by a shaft 11 and rotates, and opposite side ends of the shaft 11 are shaft-coupled to opposite side frames (or, side covers) of the reel body to enable the spool 10 and the shaft 11 to rotate together.

Such a spool 10 has a skein-type drum structure, and includes: a body part 12 having an outer surface thereof on which a fishing line wound and having open opposite side surfaces thereof; and a shaft part 13 connected to the inside of the body part 12 and through which the shaft is passed and coupled thereto.

The shaft part 13 protrudes in the form of a pipe in the longitudinal direction of the shaft 11 and is connected to a partition wall part 14 that shields inner spaces of opposite sides of the body part 12.

In addition, the body part 12 includes coupling parts 12A and 12B protruding to and connected to a first side of the body part along an edge of an opening 12S at the first side or protruding to and connected to the first side at a position spaced apart at a predetermined interval from an inner side of the edge of the opening 12S at the first side, wherein the coupling parts 12A and 12B are provided with a female screw part 12a or a male screw part 12b. In addition, a female screw part 12a formed on the inner circumferential surface of a first coupling part 12A and a male screw part 12b formed on the outer circumferential surface of a second coupling part 12B are representatively shown in the drawings.

Alternatively, the body part 12 may further include a third coupling part 12C protruding to the first side along the edge of the opening 12S at the first side to be connected and having a fitting groove 12c formed by opening the first side surface.

The male screw part 12b, the female screw part 12a, and the fitting groove 12c are each used for mounting a fixed pad 41, and a detailed description will be described later.

Subsequently, the braking magnet 22 is provided by being spaced apart at a predetermined interval on an outer side of the opening 12S at the first side of the body part 12.

Specifically, a plurality of braking magnets 22 is radially mounted on a ring-shaped magnet plate 21 to form a magnetic force generator 20, and this magnetic force generator 20 is fixed and mounted on an inner side surface of a first side of the reel body.

At this time, the magnetic force generator 20 is provided to move backward and forward in the longitudinal direction of the shaft 11 by a braking dial (not shown) exposed to the outside of the reel body (or side cover on a palm side), so that a user may be able to adjust a position of the braking magnet 22 (i.e., the position where maximum braking force occurs) through the braking dial.

Through this way, the user may adjust the maximum braking force to suit himself or herself by changing the magnitude of the magnetic force acting on the fixed pad 41 and the movable pad 42 of the spool plate 40.

That is, as the braking magnet 22 is positioned closer to the spool plate 40, the magnitude of the magnetic force acting on the movable pad 42 and the fixed pad 41 increases, thereby increasing the braking force, whereas, as the braking magnet 22 is positioned farther from the spool plate 40, the magnitude of the magnetic force acting on the movable pad 42 and the fixed pad 41 decreases, thereby decreasing the braking force.

Next, the spool cam 30 is fitted to the shaft part 13 and rotates together with the spool 10, and includes a pressing part protruding toward a first side thereof so that the lowest points 31L, 23L, 33L, and 34L and the highest points 31H, 32H, 33H, and 34H are obliquely connected to each other in the circumferential direction.

Such a spool cam 30 is extrapolated to a first side end of the shaft part 13, and at this time, the spool cam 30 is coupled to the partition wall part 14 by a protrusion, so that the spool 10, the shaft 11, and the spool cam 30 rotate together.

The pressing part of the spool cam 30 has a cam shape formed to have a height difference, and specific configurations and structures of the pressing parts are different from each other according to the first and second exemplary embodiments, but there is no difference in the basic concept of the first and second exemplary embodiments in that a spool plate 40 is moved forward and backward by using the height difference during accelerated rotation of the spool 10. However, there is only a difference in the structure of the first and second exemplary embodiments according to the presence or absence of the locking lever 60, and thus this will be described later.

The spool plate 40 is coupled to the opening 12S at the first side of the body part 11, and includes: a fixed pad 41 provided with an exposed hole 41S having a predetermined size in the center thereof and on which the magnetic force of the braking magnet 22 always acts; and a movable pad 42 fitted to the first side end of the shaft 11 and is coupled to be able to move forward and backward in the longitudinal direction of the shaft 11 toward the exposed hole 41S, wherein the magnitude of the magnetic force acting on the braking magnet 22 varies depending on the distance moved forward and backward.

Both the fixed pad 41 that may be referred to as a fixed magnet brake and the movable pad 42 that may be referred to as a movable magnet brake are metal materials on which the force pulled by the magnetic force of the braking magnet 22 acts, and when the spool 10 rotates, the braking force is generated by the braking magnet 22.

In addition, the fixed pad 41 is screwed to the female screw part 12a or the male screw part 12b of the body part 12, so that the fixed pad 41 is detachable.

That is, in the fixed pad 41, not only a distance from the braking magnet 22 may be different depending on the degree of screw tightening, but also the distance from the braking magnet 22 different may be made different by replacing the fixed pad 41 with a fixed pad having a different thickness or height, thereby allowing a user to arbitrarily adjust the magnitude of the magnetic force always acting on the fixed pad 41 through the distance adjustment.

However, a range of the distance adjustment of the fixed pad 41 is made within the limit in which the fixed pad 41 and the braking magnet 22 are not contacted with each other when the fixed pad 41 is as close to the braking magnet 22 as possible, and the limit in which the fixed pad is affected by the magnetic force of the braking magnet 22 even when the fixed pad 41 is as far away from the braking magnet 22 as possible.

Figure 5:
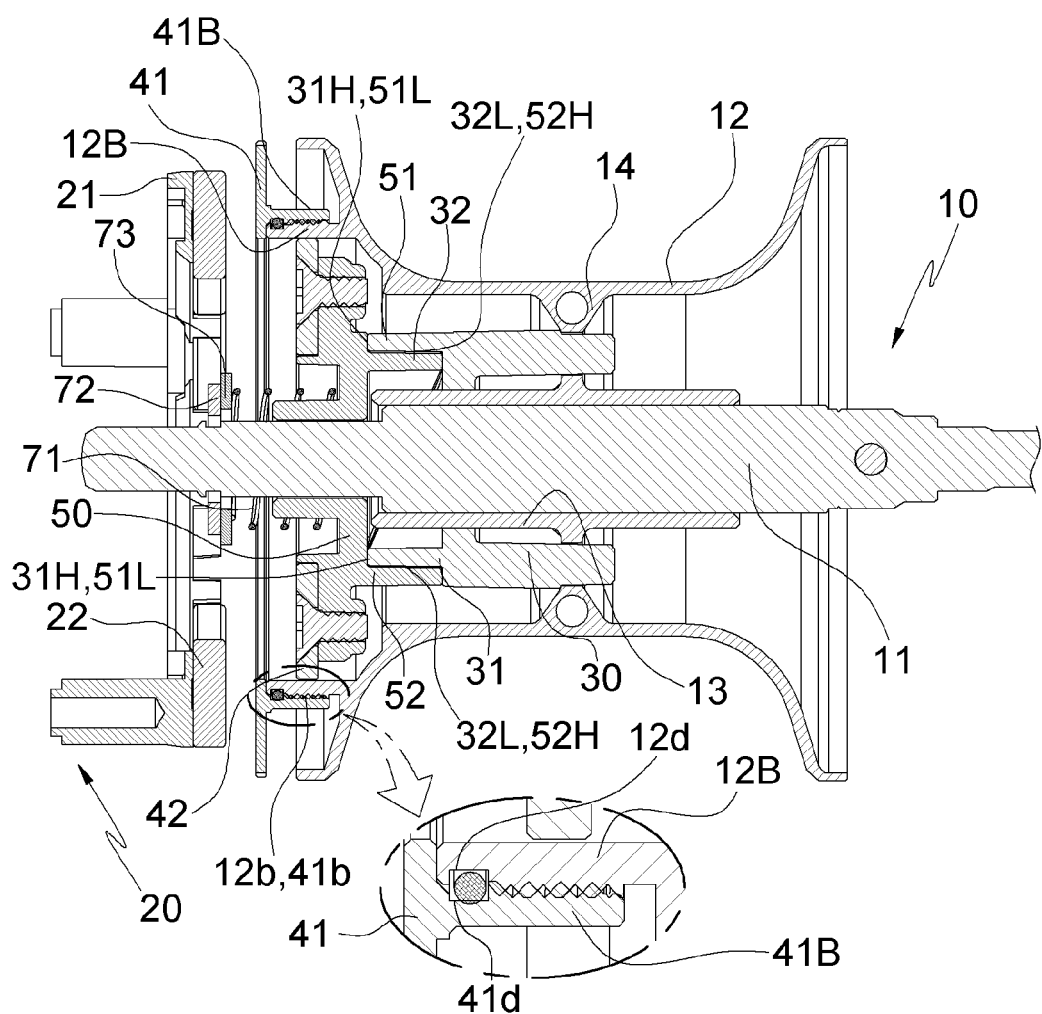
FIGS. 5 and 6 are longitudinal sectional views showing a modified example of FIG. 3.

In FIG. 3, an exemplary embodiment shows that a screw thread 41a is formed on the outer circumferential surface of the first side wall part 41A protruding to a second side along the edge of the fixed pad 41 and connected to be inserted into the first coupling part 12A, and the first side wall part 41A is screwed to the female screw part 12a of the first coupling part 12A, whereby the mounting position of the fixed pad 41 is adjustable and detachable. In FIG. 5, another exemplary embodiment shows that a screw thread 41b is formed on the inner circumferential surface of the second side wall part 41B protruding to the second side at a position spaced apart at a predetermined interval toward an inner side of the edge of the fixed pad 41 and connected to be inserted into the second coupling part 12B, and the second side wall part 41B is screwed to the male screw part 12b of the second coupling part 12B, whereby the mounting position of the fixed pad 41 is adjustable and detachable.

Moreover, the fixed pad 41 further includes an O-ring 44 fitted to a part that is screwed with the body part 12, wherein the fixed pad 41 is prevented from loosening through the O-ring 44, and as the degree of compression of the O-ring 44 varies depending on the degree of screw tightening of the fixed pad 41, the position of the fixed pad 41 is changed, so that fine adjustment of the basic braking force is possible.

Describing the exemplary embodiment of FIG. 3 in detail, the first side wall part 12A and the first coupling part 41A are respectively provided with coupling grooves 12d and 41d to which the O-rings 44 are fitted at outer side ends that are not screwed.

Each of the coupling grooves 12d and 41d is formed concave in the circumferential direction on the inner circumferential surface of the first side wall part 12A and the outer circumferential surface of the first coupling part 41A, and thus the O-ring 44 is fitted between the coupling grooves 12d and 41d.

When the fixed pad 41 is screwed, such a O-ring 44 is screwed to the female screw part 12a as the screw thread 41a compresses the O-ring 44, and when the screwing of the fixed pad 41 is completed, the O-ring 44 is caught while being inserted between the coupling grooves 12d and 41d, whereby the fixed pad 41 is prevented from being broken away and separated from the body part 12 by being unintentionally released due to rotational vibration of the spool 10, etc.

In addition, when the user holds the fixed pad 41 and intentionally releases the fixed pad with a strong force, the screw thread 41a is released from the female screw part 12a while compressing the O-ring 44, and thus the fixed pad 41 moves toward the braking magnet 22 and becomes closer. Therefore, the user intentionally changes the degree of screw tightening after completing the screwing of the fixed pad 41, so that the distance between the fixed pad 41 and the braking magnet 22 is slightly changed and the magnitude of the magnetic force varies depending on the distance change, whereby the basic braking force acting on the fixed pad 41 may be arbitrarily finely adjusted and used.

Meanwhile, the fixed pad 41 further includes: a locking part 41c fitted to the fitting groove 12c; and a retainer 43 for fixing the locking part 41c to the fitting groove 12c, wherein the fixed pad 41 is detachable.

That is, the fixed pad 41 may be replaced with another fixed pad having a different thickness or height by using the retainer 43, so that the distance from the braking magnet 22 may be made different, and thus the distance adjustment allows the user to arbitrarily adjust the magnitude of the magnetic force always acting on the fixed pad 41.

Figure 6:
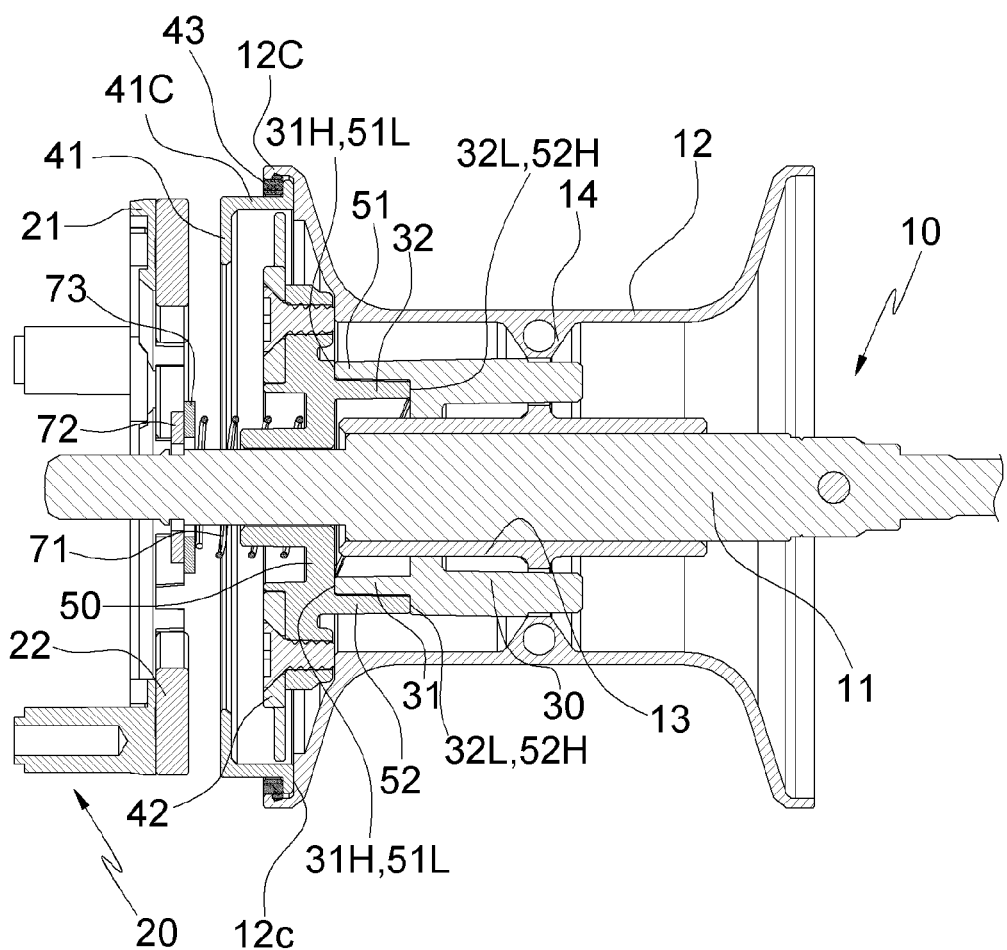

In FIG. 6, the exemplary embodiment shows that there is provided a locking part 41c bent outwardly and connected to the end of the third side wall part 41C connected to protrude to the second side along the edge of the fixed pad 41, so that the ring-shaped retainer 43 is mounted on the fitting groove 12c, while covering the locking part 41c, in the state where the locking part 41c is fitted to the fitting groove 12c, whereby the fixed pad 41 is detachable.

A magnetic force always acts on the fixed pad 41 regardless of the distance to the braking magnet 22, and such a fixed pad 41 generates a braking force to the spool 10 at all times regardless of the rotational speed of the spool 10, so that it is possible to prevent the backlash phenomenon occurring due to the magnetic force acting on the fixed pad 41 even when the spool 10 rotates at a low speed and no inertial force is generated on the movable pad 42.

The movable pad 42 is extrapolated from the outer side of the shaft part 13 to a connecting part 11a at a first side of the shaft 11, and at this time, the movable pad 42 is coupled in a structure capable of idling in the connecting part 11a.

Specifically, the movable pad 42 is provided with the fitting hole 42a to which a stepped part protruding from a first side surface of the movable cam 50 is fitted, and is coupled to the movable cam 50 by a bolt.

At this time, the movable pad 42 is configured to have a size and shape corresponding to the exposed hole 41S, or may be configured to include: a pad part 42A having a size and shape corresponding to the exposed hole 41S; and a flange part 42B extended and connected to the outer side of the pad part 42A and being in surface contact with a second side surface of the fixed pad 41.

The movable cam 50 is coupled to a second side (i.e., right side in the drawing) surface of the movable pad 42 and has a pressed part protruding to the second side so as to contact with the pressing part.

The movable cam 50 is provided with the pressed part protruding on the second side surface; a support pipe 55 protruding in the center of the first side surface and to which a connecting part 11a of the shaft 11 is fitted; and a support groove 56 provided concave along the circumference of the support pipe 55.

Like the spool cam 30, the movable pad 42 and the movable cam 50 have different specific configurations and structures of the movable pad 42 and the movable cam 50 according to the first and second exemplary embodiments, but there is no difference in the basic concept of the first and second exemplary embodiments in that the movable pad 42 and the movable cam 50 receives a forward pressure from the spool cam 30 toward the outer side due to the inertial force when the spool 10 is rotated at an accelerated speed, and receives a backward pressure from the elastic body 70 toward the inner side when the spool 10 is rotated at a decelerated speed. However, there is only a difference in the structure of the first and second exemplary embodiments depending on the presence or absence of the locking lever 60, and thus this will be described later.

Subsequently, the elastic body 70 elastically supports the movable pad 42 in the second side direction away from the braking magnet 22, and is composed of a compression spring 71 extrapolated to the first side end of the shaft 11 and in which an elastic force is exerted in the opposite direction of compression.

The compression spring 71 has a first side end thereof supported by a washer 73 fixed with a retainer 72 at a predetermined position at the first side end of the shaft 11, and has a second side end thereof supported by the movable pad 42 (i.e., more particularly, the support groove 56 of the movable cam 50) so that the movable pad 42, that is, the spool plate 40 is forced to move backward in the direction of the spool cam 30 opposite to the braking magnet 22.

In the present disclosure, when the spool 10 rotates below a predetermined speed, the inertial force does not act thereon, so that in a state in which the movable pad 42 does not move forward to the braking magnet 22, a basic braking force for rotation of the spool 10 is generated by magnetic force acting on the fixed pad 41. Whereas, when the spool 10 rotates above a predetermined speed, the inertial force acts thereon, so that the pressed part positioned at each of the lowest points 31L, 32L, 33L, and 34L of the pressing part ascends along the pressing part toward each of the highest points 31H, 32H, 33H, and 34H of the pressing part, whereby as the movable pad 42 moves toward the braking magnet 22, the distance therebetween decreases, and thus, an additional braking force against the rotation of the spool 10 is generated and strengthened. Meanwhile, when the spool 10 rotates at a decelerated speed below a predetermined speed, the elastic force of the elastic body 70 exceeds the inertial force, so that the pressed part descends along the pressing part toward the lowest points 31L, 32L, 33L, and 34L of the pressing part, whereby as the movable pad 42 moves backward in the second side direction, the distance therebetween increases, and thus, the additional braking force against rotation of the spool 10 is decreased and disappears.

That is, when casting is performed, as the spool 10 momentarily starts to rotate, the pressing part pushes the pressed part in the forward rotational direction of the spool 10, and due to the inclined structure of the pressing part, the movable cam 50 rotates together with the spool 10 while receiving a force that pushes in the longitudinal direction of the first side of the shaft 11. At this time, when the spool 10 rotates below a predetermined speed, the inertial force of the spool cam 30 is not generated because the inertial force of the spool cam 30 is less than the elastic force of the elastic body 70, and accordingly, the movable pad 42 is not pushed in the direction of the braking magnet 22 by the inertial force, so that the spool 10 is affected only by the magnetic force acting on the fixed pad 41, and a predetermined braking force is constantly generated, thereby preventing the occurrence of a backlash phenomenon, such as pitching, when the rotational force of the spool is weak. Whereas, when the spool 10 rotates with acceleration above a predetermined speed, the inertial force of the spool cam 30 exceeds the elastic force of the elastic body 70 and acts in the longitudinal direction of the first side of the shaft 11, and accordingly, the movable pad 42 is pushed in the direction of the braking magnet 22 by the inertial force and approaches the braking magnet 22, so that a braking force for the spool 10 is generated as the magnetic force acting on the spool plate 40 increases, thereby preventing the occurrence of a backlash phenomenon due to overspeed of the spool 10.

In addition, when the spool 10 is decelerated below a predetermined speed by the braking magnet 22 during casting, as the inertial force having pressed the movable pad 42 in the direction of the braking magnet 22 weakens, the elastic force of the elastic body 70 exceeds the inertial force of the spool cam 30 and acts in the longitudinal direction of the second side of the shaft 11, and accordingly, as the movable pad 42 is returned in the opposite direction of the braking magnet 22 by the elastic body 70 and moves away from the braking magnet 22, the magnetic force acting on the movable pad 42 becomes less and the additional braking force on the spool 10 is reduced and then disappears, so that the spool 10 rotates at a decelerated speed from high speed to low speed, thereby preventing the casting distance from decreasing.

Next, the specific configuration, operation, and effects of the first and second exemplary embodiments having the above configuration will be described in more detail.

First, as the first exemplary embodiment of the present disclosure, as shown in FIGS. 1 to 4B, the pressing part is a dual cam configured to include: a first cam part 31 connected to be inclined upward in opposite directions from a lowest point 31L at the first side toward a highest point 31H positioned on a second side opposite to the lowest point 31L; and a second cam part 32 connected to be inclined upward in opposite directions from a lowest point 32L at the second side toward a highest point 32H positioned on the first side opposite to the lowest point 32L so as to be arranged concentrically with a diameter different from that of the first cam part 31 but to be symmetrical with the first cam part 31. Whereas, the pressed part is a dual cam configured to include: a third cam part 51 formed in a shape corresponding to the first cam part 31 to be in surface contact with the tip end of the first cam part 31; and a fourth cam part 52 formed in a shape corresponding to the second cam part 32 to be in surface contact with the tip end of the second cam part 32.

The first to fourth cam parts 31, 32, 51, and 52 have conical shapes in which an outer circumferential surface of the first side is cut, and the inclined guide surfaces 31a, 32a, 51a, and 52a are formed in a semicircular shape on the opposite sides of the lowest points 31L, 32L, 51L, and 52L to be connected to the highest points 31H, 32H, 51H, and 52H, respectively.

In addition, the first cam part 31 and the third cam part 51 each have the same diameter, and the second cam part 32 and the fourth cam part 52 each have the same diameter, and at this time, the first and third cam parts 31 and 51 and the second and fourth cam parts 32 and 52 are arranged crosswise so that each of the lowest point and the highest point is positioned in opposite directions to each other, whereby, when the movable pad 42 is moved backward in the direction of the spool cam 30 by the elastic body 70 in the stopped state of the spool 10, as the lowest point 51L and the highest point 51H of the third cam part 51 are respectively positioned at the highest point 31H and the lowest point 31L of the first cam part 31, and as the lowest point 52L and the highest point 52H of the fourth cam part 52 are respectively positioned at the highest point 32H and the lowest point 32L of the second cam part 32, the inclined guide surfaces 51a and 52a of the movable cam 50 are respectively in surface contact with the inclined guide surfaces 31a and 32a of the spool cam 30 in a form in which the spool cam 30 and the movable cam 50 are completely engaged with each other.

In this way, before casting, in the stopped state of the spool 10, the movable cam 50 is moved backward to be in surface contact with the spool cam 30 by the compression spring 71, so that the distance between the braking magnet 22 and the movable pad 42 is increased to a maximum value, and thus only the braking force is generated by the fixed pad 41, but no additional braking force is generated by the movable pad 42.

When casting is performed in this state, as described earlier, the spool 10 rotates as the fishing line is released, and at this time, when the rotational force of the spool 10 is weak, an inertial force does not occur in the movable pad 42, so that only the fixed pad 41 is affected by the magnetic force of the braking magnet 22, and a predetermined braking force is constantly generated, thereby preventing a backlash phenomenon that may occur when the spool 10 rotates at a low speed, whereas, when the spool 10 accelerates and rotates above a predetermined speed and the rotational force is strong, the inertial force acts on the movable cam 50 by the pressure of the spool cam 30, so that while the lowest points 51L and 52L of the third and fourth cam parts 51 and 52 respectively ascend along the inclined guide surfaces 31*a* and 32*a* toward the highest points 31H and 32H of the first and second cam parts 31 and 32, the movable pad 42 moves forward in the direction of the braking magnet 22 so as to generate an additional braking force by the magnetic force. In addition, while the additional braking force gradually increases as the movable pad 42 gets closer to the braking magnet 22, when the compression spring 71 is fully compressed, that is, when the movable pad 42 approaches the braking magnet 22 to the maximum value, maximum braking force is generated.

The first and second cam parts 31 and 32 of the spool cam 30 respectively push the third and fourth cam parts 51 and 52 of the movable cam 50 to rotate the movable cam 50 together.

In addition, as the rotational speed of the spool 10 decreases during casting, the inertial force applied to the movable pad 42 decreases and the elastic force of the compression spring 71 exceeds the inertial force, thereby pressing the movable pad 42 toward the spool cam 30. Therefore, as the third and fourth cam parts 51 and 52 respectively descend along the inclined guide surfaces 31*a* and 32*a* of the first and second cam parts 31 and 32, the movable cam 50 moves backward while rotating in the reverse direction (Here, for reference, the rotating in the reverse direction means that in a state where the spool cam 30 and the movable cam 50 simultaneously rotate forward in the same direction as the spool 10, only the movable cam 50 rotates at a speed lower than that of the spool cam 30 and returns backward due to the idling structure with the shaft 11, and the reverse direction for rotation should be interpreted as the relative direction with respect to the spool cam 30) and is combined with the spool cam 30. Accordingly, as the movable pad 42 moves backward in the direction of the spool cam 30 and moves away from the braking magnet 22 again, the additional braking force generated by the moving forward of the movable pad 42 gradually decreases and then disappears. At this time in the first exemplary embodiment of the present disclosure, since the inclined guide surfaces 31*a* and 51*a* of the first and third cam parts 31 and 51, and the inclined guide surfaces 32*a* and 52*a* of the second and fourth cam parts 32 and 52 are respectively formed obliquely upward in opposite directions to each other, the movable cam 50 may be subjected to move forward by the spool cam 30 toward the direction of the braking magnet 22 during casting, even when the spool 10 rotates in either a first direction (i.e., forward direction, for example, clockwise) or a second direction (i.e., reverse direction or counterclockwise), and thus the movable magnetic brake of the present disclosure may be used in common regardless of whether the handle of the fishing reel is used for the left-handed or right-handed (i.e., regardless of the direction of rotation of the spool from which the fishing line is released).

Next, the second exemplary embodiment of the present disclosure will be described.

As the second exemplary embodiment of the present disclosure, as shown in FIGS. 7 to 10D, the pressing part is a dual cam configured to include: two or more fifth cam parts 33 connected to be inclined upward in the first direction from the lowest point 33L at a first side toward the highest point 33H at a second side and arranged by being spaced apart at predetermined intervals in the circumferential direction; and two or more sixth cam parts 34 arranged concentrically with a diameter different from that of the fifth cam part 33, connected to be inclined upward in the second direction from the lowest point 34L at the first side to the highest point 34H at the second side, and arranged by being spaced apart at predetermined intervals in the circumferential direction. Whereas, the pressed part is a dual cam configured to include: two or more seventh cam parts 53 formed in a shape corresponding to the fifth cam part 33 so as to be in surface contact with the tip end of each of the fifth cam parts 33; and two or more eighth cam parts 54 formed in a shape corresponding to the sixth cam part 34 so as to be in surface contact with the tip end of each of the sixth cam parts 34, wherein the movable cam 50 includes a first guide groove 53*c* and a second guide groove 54*c* formed in an arc direction between adjacent seventh cam parts 53 and between adjacent eighth cam parts 54. The second exemplary embodiment of the present disclosure further includes: a locking lever 60 provided with a first stopper 61 and a second stopper 62 interposed between the movable pad 42 and the movable cam 50 and coupled to be rotatable in opposite directions in the circumferential direction, the first stopper 61 and second stopper 62 protruding from the second side surface and being fitted between the fifth cam parts 33 and the sixth cam parts 34 by passing through each of the guide grooves 53*c* and 54*c*, so that when the locking lever 60 is rotated in any one direction, one of the stoppers 61 and 62 is caught on the first side end of the fifth cam 33 or the second side end of the sixth cam 34, whereby the rotational direction of the spool cam 30 may be limited to the first direction (i.e., the same rotational direction as the locking lever 60).

The pressing part and the pressed part of the second exemplary embodiment have the same dual cam structure as the first exemplary embodiment, but the first to fourth cam parts 31, 32, 51, and 52 of the first exemplary embodiment are connected to each other in a circular shape, whereas, in the fifth to eighth cam parts 33, 34, 53, and 54 of the second exemplary embodiment, there is a difference in that each cam part arranged on the same circle has a shape separated by being spaced apart at a predetermined interval, and also there is a difference in that the directions in which the inclined guide surfaces 33*a* and 53*a* of the fifth and seventh cam parts 33 and 53 and the inclined guide surfaces 34*a* and 54*a* of the sixth and eighth cam parts 34 and 54 are inclined upward, the inclined guide surfaces being respectively arranged concentrically inward and outward, are formed in opposite directions to each other.

Specifically, in the fifth cam part 33, the lowest point 33L and the highest point 33H are radially spaced apart at predetermined intervals and are sequentially arranged, and the inclined guide surface 33a connecting the highest point 33H from the lowest point 33L is formed to be inclined upward in the first direction.

In addition, in the sixth cam part 34 formed different in diameter from the fifth cam part 33, the lowest point 34L and the highest point 34H are provided at the same positions as in the case of the fifth cam part 33, wherein each inclined guide surface 34a connecting the lowest point 34L to the highest point 34H is formed to be inclined upward in the second direction that is the opposite direction to the fifth cam part 33.

Each of these fifth cam parts 33 and the sixth cam parts 34 is arranged by being spaced apart at a predetermined interval on the same circle and are provide with horizontal guide surfaces 33b and 34b respectively connected thereto horizontally with a height of the lowest points 33L and 34L without having inclination between the cam parts.

At this time, unlike the first exemplary embodiment, in the spool cam 30 of the second exemplary embodiment, since an empty space is formed between the cam parts (i.e., the sixth cam parts 34 in the drawing) positioned on the inner side of the spool cam (i.e., the horizontal guide surface 34b), the spool cam 30 is not completely in surface contact with and combined with the shaft part 13, so that in order to ensure safe coupling, the spool cam 30 of the second exemplary embodiment is provided with a tube body part 35 on the inner circumferential surface of the sixth cam part 34 positioned at the inner side, the tube body part being extendedly connected by protruding in the first side direction toward the highest point 34H.

In addition, corresponding to the fifth cam part 33 and the sixth cam part 34 respectively, in the seventh cam part 53 and the eighth cam part 54, each of the lowest points 53L and 54L is provided radially at a position of each of the highest points 33H and 34H of each of the fifth and sixth cam parts 33 and 34, and each of the highest points 53H and 54H is provided radially at a position of each of the lowest points 33L and 34L of each of the fifth and sixth cam parts 33 and 34. Each of the inclined guide surfaces 53a and 54a connecting each of the highest points 53H and 54H to each of the lowest points 53L and 54L is connected to be inclined upward in the same direction of each of the inclined guide surfaces 33a and 34a of each of the fifth cam part 33 and the sixth cam part 34. Each of the seventh cam parts 53 and the eighth cam parts 54 is arranged at a predetermined interval on the same circle, so that horizontal guide surfaces 53b and 54b are provided between the cam parts.

At this time, between the seventh cam parts 53 and between the eighth cam parts 54, there is provided the first and second guide grooves 53c and 54c formed by passing through opposite sides of a part of the horizontal guide surfaces 53b and 54b in an arc shape.

In addition, the movable cam 50 of the second exemplary embodiment is provided with a receiving groove 57 formed concave and partitioned by a sidewall along the circumference of the support pipe 55, so that the locking lever 60 is inserted into the receiving groove 57.

In addition, one or more locking protrusions 57a are provided by protruding inward on the inner circumferential surface of the receiving groove 57.

Next, the locking lever 60 is a ring-shaped member that is fitted to the receiving groove 57 to rotate in both left and right directions with respect to the sidewall of the movable cam 50 as an axis, and the first and second stoppers 61 and 62 that are fitted to and slidably coupled to the first and second guide grooves 53c and 54c of the movable cam 50 respectively protrude on the second side surface.

In addition, the locking lever 60 is provided with one or more operating protrusions 63 protruding on the first side surface, and the movable pad 42 is provided with a guide groove 42b formed in an arc shape by passing through the opposite sides thereof corresponding to the operating protrusion 63, so that the operating protrusion 63 is fitted to and slidably coupled to the guide groove 42b, whereby the locking lever 60 may be rotated in the opposite directions through the operating protrusion 63.

In addition, the locking lever 60 is provided with a pair of locking grooves 64 to which the locking protrusions 57a are caught on the outer circumferential surface of the locking lever 60, and the locking grooves 64 are spaced apart from the guide grooves 53c and 54c at equal intervals.

In this second exemplary embodiment as with the first exemplary embodiment, the movable cam 50 moves backward in the direction of the spool cam 30 by the compression spring 71 while the spool 10 is stopped, so that the lowest point 53L and the highest point 53H of the seventh cam part 53 are respectively positioned at the highest point 33H and the lowest point 33L of the fifth cam part 33, and the lowest point 54L and the highest point 54H of the eighth cam part 54 are respectively positioned at the highest point 34H and the lowest point 34L of the sixth cam part 34, whereby the inclined guide surfaces 53a and 54a of the movable cam 50 are respectively in surface contact with the inclined guide surfaces 33a and 34a of the spool cam 30.

In this state, as with the first exemplary embodiment, no additional braking force is generated because the magnetic force of the braking magnet 22 does not act on the movable pad 42.

Figure 10A:
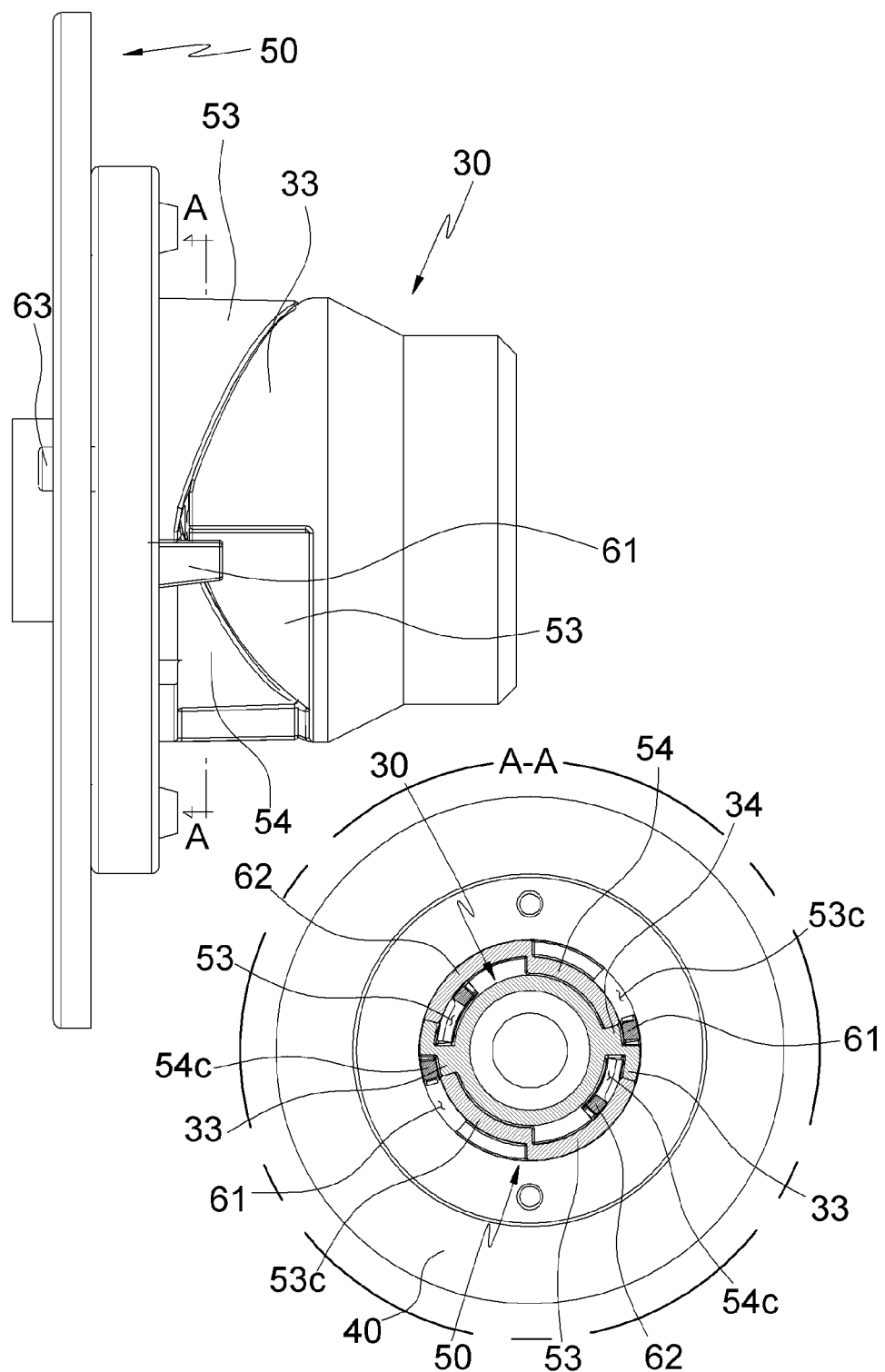
FIGS. 10A, 10B, 10C, and 10D are front views of a main part for showing forward and backward operation of a movable pad in the second exemplary embodiment.

At this time, when the locking lever 60 is rotated in one direction (i.e., clockwise) as shown in FIG. 10A, the first stopper 61 moves to the first side end of the first guide groove 53c and is caught so as to contact with a side surface of the highest point 33H of the fifth cam part 33, whereas the second stopper 62 moves to the second side end of the second guide groove 54c and is spaced apart from the highest point 34H of the sixth cam part 34 in the first side direction, and thus, in this state, the spool cam 30 may be rotated only in one direction by the first stopper 61.

Figure 10B:
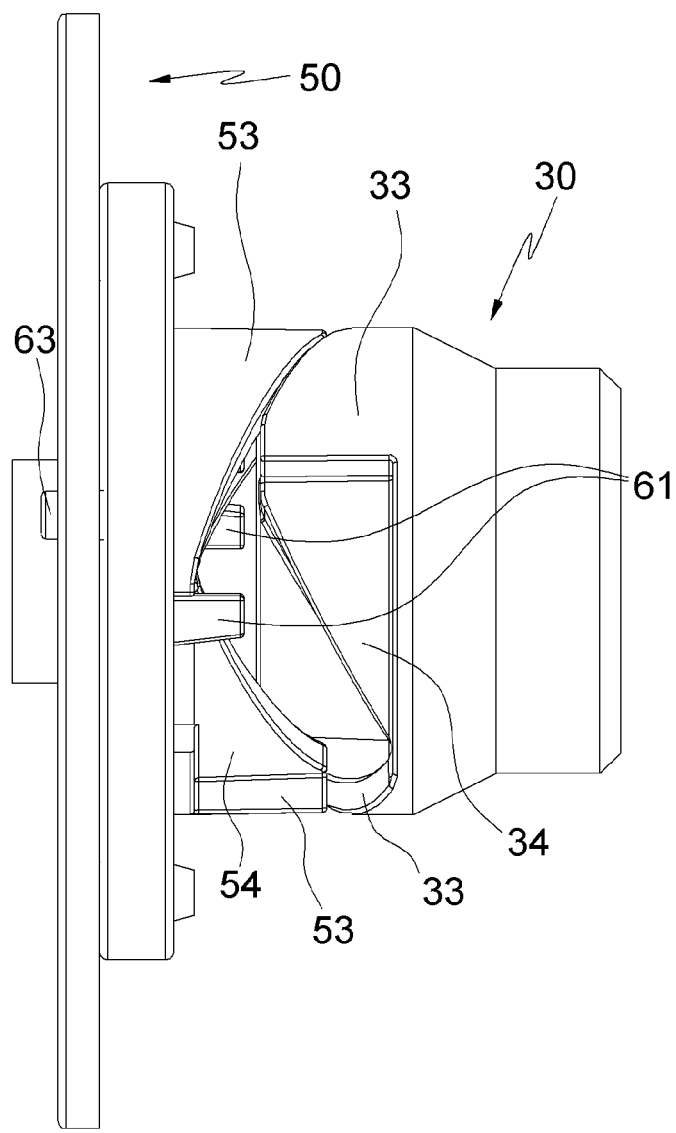

Therefore, in the second exemplary embodiment of the present disclosure, in the case where the spool 10 is mounted on a left-handed (or right-handed) fishing reel that rotates in one direction, when the locking lever 60 sets the rotational direction of the spool cam 30 to be aligned in the same direction as the spool 10 and then casts, the fishing line is released so that the spool 10 accelerates and rotates above a predetermined speed, whereby at this time, as shown in FIG. 10B, the seventh cam part 53 of the movable cam 50 moves forward to the outer side along the fifth cam part 33 of the spool cam 30, thereby generating an additional braking force, whereas, when the rotational speed of the spool 10 is decelerated below a predetermined speed, the movable cam 50 is returned to its original position in the direction of the spool cam 30 by the compression spring 71, whereby the additional braking force is disappeared.

Figure 10C:
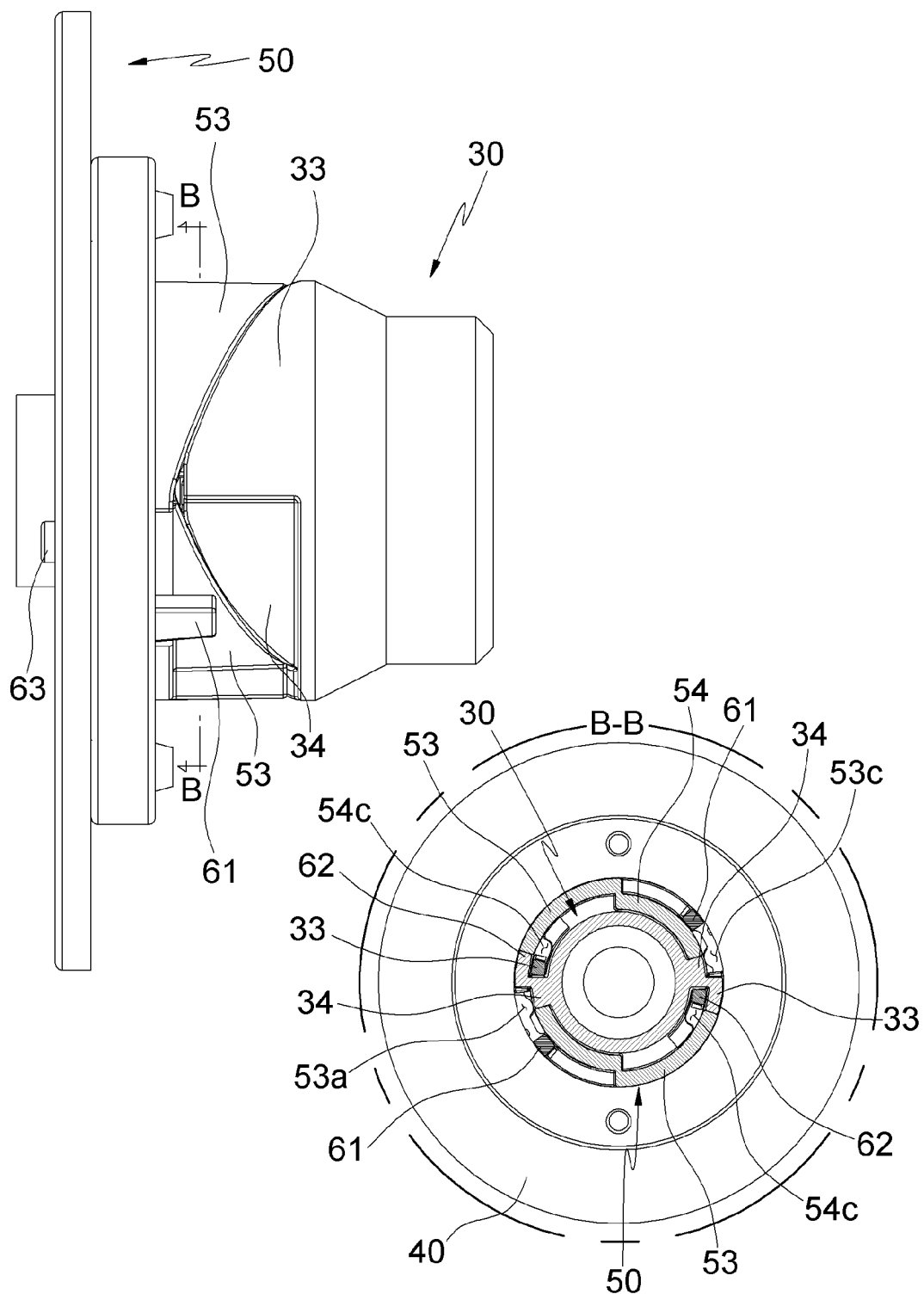

Conversely, when the locking lever 60 is rotated in the other direction (i.e., counterclockwise) as shown in FIG. 10C, the first stopper 61 moves to the second side end of the first guide groove 53c and is spaced apart from the highest point 33H of the fifth cam part 33 in the other direction, and the second stopper 62 moves to the second side end of the second guide groove 54c and is caught to contact with the side surface of the highest point 34H of the sixth cam part 34, so that in this state, the spool cam 30 may be rotated only in the second direction by the second stopper 62.

Figure 10D:
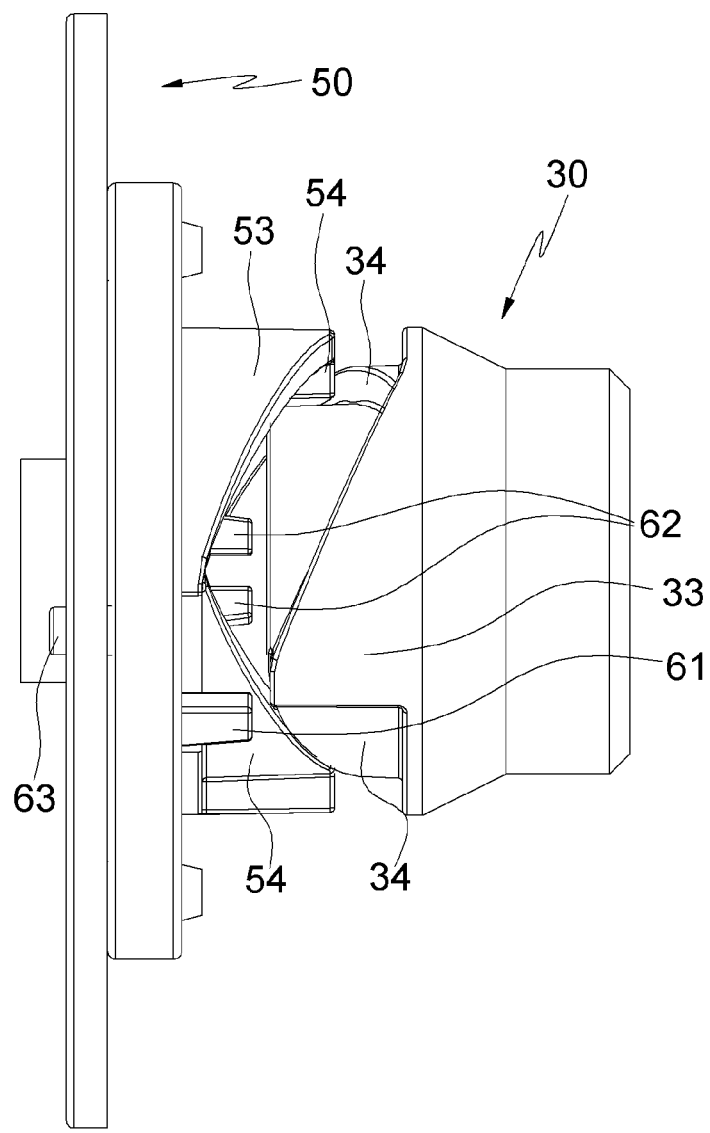

Therefore, in the second exemplary embodiment of the present disclosure, in the case where the spool 10 is mounted on a right-handed (or left-handed) fishing reel that rotates in the other direction, when the locking lever 60 sets the rotational direction of the spool cam 30 to be aligned in the same direction as the spool 10 and then casts, the fishing line is released so that the spool 10 accelerates and rotates above a predetermined speed, whereby at this time, as shown in FIG. 10D, the eighth cam part 54 of the movable cam 50 moves forward to the outer side along the sixth cam part 34 of the spool cam 30, thereby generating an additional braking force, whereas, when the rotational speed of the spool 10 is decelerated below a predetermined speed, the movable cam 50 is returned to its original position in the direction of the spool cam 30 by the compression spring 71, whereby the additional braking force is disappeared.

At this time, when the locking lever 60 is rotated in opposite directions, the locking protrusion 57a is caught in any one of the locking grooves 64 to prevent rotation of the locking lever 60, and unless the direction of the locking lever 60 is arbitrarily changed by using the operating protrusion 63, the locking lever 60 continues to maintain its initial setting state.

As in the second exemplary embodiment, when it is possible to change a rotatable direction of the spool cam 30 by using the locking lever 60, there is an advantage in that regardless of the left-handed fishing reel and the right-handed fishing reel, the integrated production and use of fishing reels may be possible by dividing the present disclosure into the left-handed use only or the right-handed use only.

In the present disclosure having such first and second exemplary embodiments, the basic braking force is constantly generated by the fixed pad 41 regardless of the rotational speed of the spool 10, and at the same time the distance between the braking magnet 22 and the movable pad 42 is automatically adjusted by the inertial force that changes depending on the speed increase or decrease of the spool 10, thereby preventing the occurrence of the backlash phenomenon, as well as preventing a reduction in casting distance, occurring due to an excessive braking force, by way of automatically adjusting the braking force depending on the rotational speed of the spool 10.

In addition, in the present disclosure, since the fixed pad 41 and the movable pad 42 do not contact with the braking magnet 22, noise due to friction and wear of parts do not occur, and it is also possible to provide an optimum braking force depending on the real-time rotational speed of the spool 10 even without any adjustments during casting. In addition, as the compression spring 71 is replaced to adjust the elastic force or by changing the thickness or material of the fixed pad 41 and/or the movable pad 42, the braking force may be customized for each user.

That is, when the elastic force of the compression spring 71 is decreased, a relatively strong braking force may be obtained for a longer time, and when the elastic force of the compression spring 71 is increased, the relatively strong braking force may be obtained for a short time and the relatively weak braking force may be obtained for a long time.

In addition, when the thickness of the fixed pad 41 and/or the movable pad 42 is increased or the material of the fixed pad 41 and/or the movable pad 42 is replaced with a material having a stronger magnetic force, a relatively high braking force may be obtained to that extent, and conversely, when the thickness of the fixed pad 41 and/or the movable pad 42 is decreased or the material of the fixed pad 41 and/or the movable pad 42 is replaced with a material having a weaker magnetic force, a relatively lower braking force may be obtained to that extent.

Furthermore, by changing the thickness by replacing a washer 73 supporting the compression spring 71, the same effect as the braking force adjustment according to the position adjustment of the braking magnet 22 may be expected to obtain, and by adjusting the braking force in such various methods, the timing at which the maximum braking force is generated, the time at which the braking force is generated may be changed and set at the user's convenience.

In the above description of the present disclosure, the fishing reel with movable inertial force brake has been described with reference to the accompanying drawings. However, the present disclosure can be variously modified, changed and substituted by those skilled in the art, and such modifications, changes and substitutions should be interpreted as falling within the protective scope of the present disclosure.

What is claimed is:

1. A fishing reel comprising:
a spool provided with a body part and a shaft part, the body part being coaxially installed on a reel body by a shaft to rotate and having a fishing line wound on an outer surface thereof and being open at opposite sides thereof, and the shaft part being connected to an inner side of the body part and through which the shaft is passed and coupled thereto;
a braking magnet provided by being spaced apart at a predetermined interval at an outer side of an opening on a first side of the body part;
a spool cam fitted to the shaft part to rotate with the spool and provided with a pressing part protruding to the first side of the body part so as to allow a lowest point and a highest point to be obliquely connected to each other in a circumferential direction;
a spool plate provided with a fixed pad and a movable pad, the fixed pad being coupled to the opening at the first side of the body part, provided with an exposed hole having a predetermined size in a center thereof, and having a magnetic force of the braking magnet always acting thereon, and the movable pad being fitted to a first side end of the shaft and coupled thereto to be movable forward and backward in a longitudinal direction of the shaft toward the exposed hole and having the magnetic force of the braking magnet with an acting magnitude changed depending on a forward and backward distance of the movable pad; and
a movable cam coupled to a second side of the movable pad and provided with a pressed part protruding to the second side to contact with the pressing part,
wherein when the spool rotates below a predetermined speed, an inertial force does not act, so that a basic braking force for rotation of the spool is generated by the magnetic force acting on the fixed pad in a state where the movable pad does not move forward to the braking magnet, whereas, when the spool rotates above the predetermined speed, the pressed part positioned at the lowest point of the pressing part ascends along the pressing part toward the highest point of the pressing part due to an action of the inertial force, so the movable pad moves forward to the braking magnet, and a distance therebetween is decreased, so that an additional braking force against the rotation of the spool is generated and strengthened.

2. The fishing reel of claim 1, further comprising:

an elastic body elastically supporting the movable pad so as to move the movable pad backward in a second side direction away from the braking magnet, wherein, when the spool rotates at a decelerated speed below the predetermined speed, an elastic force of the elastic body exceeds the inertial force, and the pressed part descends along the pressing part toward the lowest point of the pressing part, so the movable pad moves backward in the second side direction, and the distance is increased, so that the additional braking force against the rotation of the spool is decreased and disappears.

3. The fishing reel of claim 2, wherein the body part comprises a female screw part or a male screw part provided in the opening at the first side of the body part, and the fixed pad is screwed to the female screw part or the male screw part so that the fixed pad is detachable and further comprises an O-ring fitted to a part which is screwed to the body part, whereby the O-ring prevents loosening of the fixed pad, and as a degree of compression of the O-ring varies depending on a degree of screw tightening of the fixed pad, a position of the fixed pad is changed, so that the basic braking force is finely adjustable.

4. The fishing reel of claim 2, wherein the body part comprises a fitting groove provided in the opening at the first side of the body part, and the fixed pad further comprises a locking part fitted to the fitting groove and a retainer fixing the locking part to the fitting groove whereby the fixed pad is detachable.

* * * * *